(12) United States Patent
Kwon et al.

(10) Patent No.: US 8,787,269 B2
(45) Date of Patent: Jul. 22, 2014

(54) METHOD FOR COMMUNICATING WITH RELAY STATION

(75) Inventors: Yeong Hyeon Kwon, Anyang-si (KR); Min Seok Noh, Anyang-si (KR); Sung Ho Moon, Anyang-si (KR); Dong Cheol Kim, Anyang-si (KR); Jin Sam Kwak, Anyang-si (KR); Hyun Woo Lee, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 12/738,122

(22) PCT Filed: Nov. 12, 2008

(86) PCT No.: PCT/KR2008/006665
§ 371 (c)(1),
(2), (4) Date: Apr. 15, 2010

(87) PCT Pub. No.: WO2009/066899
PCT Pub. Date: May 28, 2009

(65) Prior Publication Data
US 2010/0220645 A1    Sep. 2, 2010

Related U.S. Application Data

(60) Provisional application No. 60/989,453, filed on Nov. 21, 2007.

(30) Foreign Application Priority Data

Mar. 11, 2008    (KR) .................. 10-2008-0022475

(51) Int. Cl.
*H04W 4/00* (2009.01)
*H04B 7/14* (2006.01)

(52) U.S. Cl.
USPC ........... 370/329; 370/279; 370/293; 370/315; 455/9; 455/14; 455/17; 455/69

(58) Field of Classification Search
USPC ......... 370/206, 208, 279, 282, 293, 315, 328, 370/329, 332, 236, 278; 455/7–25, 69, 88, 455/115.1–115.4
See application file for complete search history.

(56) References Cited

U.S. PATENT DOCUMENTS 6,205,488 B1    3/2001  Casey et al.
7,471,957 B2 *  12/2008 Palkisto et al. ............... 455/458
(Continued)

FOREIGN PATENT DOCUMENTS

| KR | 2006-0057471 A | 5/2006 |
| WO | WO 2007036161 A1 * | 4/2007 |
| WO | WO 2007/069848 A2 | 6/2007 |

*Primary Examiner* — Benjamin H Elliott, IV
(74) *Attorney, Agent, or Firm* — Mckenna Long & Aldridge LLP (57) ABSTRACT

A method for communicating with a relay station is disclosed. The method for communicating with a relay station comprises transmitting resource allocation information of downlink traffic and uplink traffic from a base station to the relay; and transmitting the downlink traffic to the relay by encapsulating the downlink traffic in accordance with the resource allocation information and receiving encapsulated uplink traffic from the relay in accordance with the resource allocation information. It is possible to enable efficient communication through a relay using a minimum interface without deterioration of throughput even in the case that a base station does not know detailed attributes of a relay existing in a system. Also, it is possible to coordinate collision through a master relay in case of a system supporting multi-hop relays.

10 Claims, 6 Drawing Sheets

(56) References Cited

U.S. PATENT DOCUMENTS

| | | | |
|---|---|---|---|
| 7,873,002 B2* | 1/2011 | Cai | 370/329 |
| 8,140,077 B2* | 3/2012 | Saifullah et al. | 455/438 |
| 2003/0118053 A1 | 6/2003 | Edsall et al. | |
| 2006/0281404 A1* | 12/2006 | Lee et al. | 455/11.1 |
| 2007/0081507 A1* | 4/2007 | Koo et al. | 370/338 |
| 2007/0264932 A1* | 11/2007 | Suh et al. | 455/13.1 |
| 2008/0219229 A1* | 9/2008 | Zheng | 370/338 |
| 2008/0227461 A1* | 9/2008 | Dayal et al. | 455/452.2 |
| 2009/0303918 A1* | 12/2009 | Ma et al. | 370/315 |
| 2010/0214930 A1* | 8/2010 | Hu et al. | 370/241 |
| 2010/0220645 A1* | 9/2010 | Kwon et al. | 370/315 |

* cited by examiner

METHOD FOR COMMUNICATING WITH RELAY STATION

This application is a national phase application based on International Application No. PCT/KR2008/006665, filed on Nov. 12, 2008, which claims priority to U.S. Provisional Application No. 60,989,453, filed on Nov. 21, 2007 and Korean Patent Application No. 10-2008-0022475, filed on Mar. 11, 2008, all of which are incorporated by reference for all purposes as if fully set forth herein.

TECHNICAL FIELD

The present invention relates to a method for communicating with a relay station, and more particularly, to a communication method for performing efficient communication without deteriorating throughput between a base station and a relay station, between a relay station and another relay station, and between a relay station and a mobile station in a system which support one or more relay systems.

BACKGROUND ART

A relay system is used to increase cell coverage without extending a base station and obtain better system throughput. The relay station (hereinafter, referred to as 'relay') is divided into a single hop relay and a multiple hop relay. In view of a mobile station, the relay is divided into a transparent relay and a non-transparent relay. Also, the relay may be divided into a fixed type and a mobile type. In order to support a relay in a system, the corresponding relay should be defined definitely. For this reason, an action type of a relay supported by the system is limited. In order to support a relay system of which standardization does not end, like IEEE 802.16, or support a new relay, a type of a relay supported by the base station should be considerably generic and should not depend on a relay structure.

Figure 1:
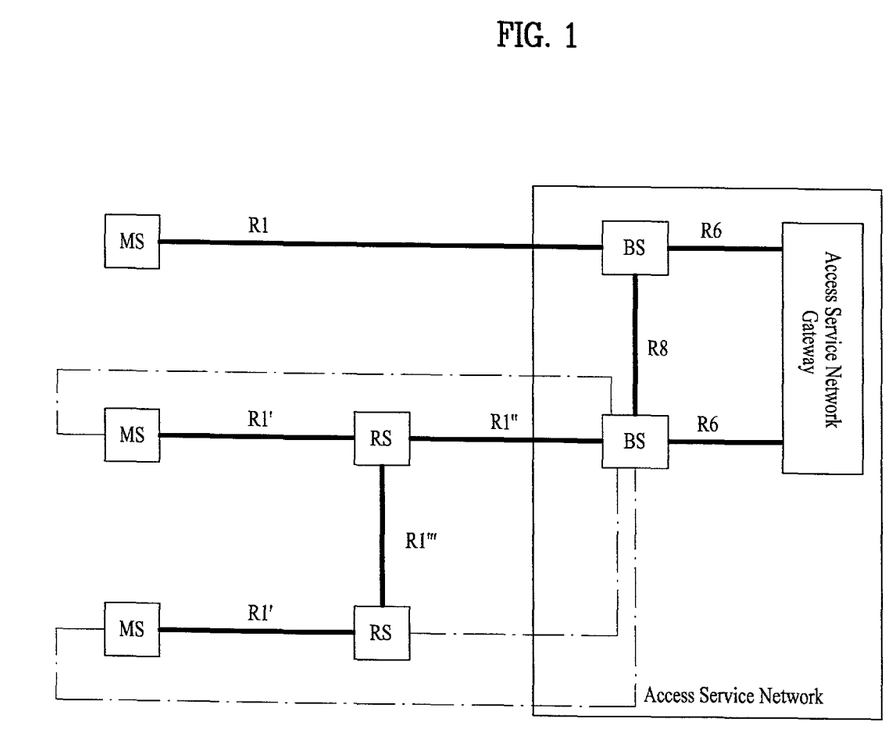
FIG. 1 is a diagram illustrating a configuration of a system supporting multi-hop relays.

FIG. 1 is a diagram illustrating a configuration of a system and an interface type when a relay is included in the system.

In FIG. 1, if a mobile station (MS) can directly communicate with a base station (BS), the mobile station performs direct communication. If the mobile station needs assistance from a relay station (RS) due to great path loss, the mobile station transfers a signal through the relay. Also, the mobile station can use multiple relays for diversity or can transfer a signal through the relay while performing direct communication with the base station.

If a single relay joins in a signal transfer procedure from the mobile station to the base station, the relay will be referred to as a single hop relay. If several relays join in the single transfer procedure, the relays will be referred to as multi-hop relays. IEEE 802.16m system requirements prescribe that a system for supporting multi-hop relays should be provided. Since an air interface supporting the IEEE system has not been finally determined, an interface provided by the base station should be considerably generic so as to support a system which is not completed, like IEEE 802.16m.

Figure 2:
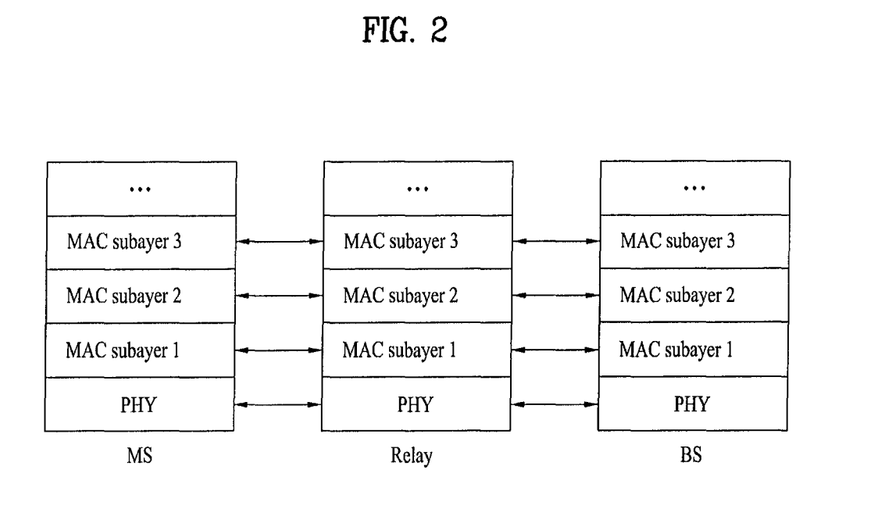
FIG. 2 is a diagram illustrating an example of communication for each layer in the system of FIG. 1.

FIG. 2 is a diagram illustrating a type of a peer-to-peer communication on a protocol stack of a system which is generally used.

If a structure of a relay is defined definitely, a protocol stack can be defined, and definite interface and procedure can be defined for each layer.

However, in a state that an actual operation of the system is not definite, it is not preferable to design interface and procedure for an unknown protocol.

DISCLOSURE

Technical Problem

Accordingly, the present invention is directed to a method for communicating with a relay station, which substantially obviates one or more problems due to limitations and disadvantages of the related art.

An object of the present invention is to provide a method for communicating with a relay station, which enables communication through a relay using a minimum interface without deterioration of throughput even in the case that a base station does not know detailed attributes of a relay existing in a system.

Another object of the present invention is to provide a method for communicating with a relay station, in which a relay performs efficient traffic transmission and reception in accordance with resources allocated from a base station, and a master relay coordinates collision in a system supporting multi-hop relays.

Technical Solution

To achieve the object and other advantages and in accordance with the purpose of the invention, as embodied and broadly described herein, a method for communicating with a relay station according to one embodiment of the present invention comprises transmitting resource allocation information of downlink traffic and uplink traffic from a base station to the relay; and transmitting the downlink traffic to the relay by encapsulating the downlink traffic in accordance with the resource allocation information and receiving encapsulated uplink traffic from the relay in accordance with the resource allocation information.

Preferably, the encapsulated downlink traffic includes control information, traffic information, and allocation information of the traffic information, which are to be transferred from the relay to mobile stations, within one traffic structure.

Preferably, the encapsulated uplink traffic includes control information, traffic information, and allocation information of the traffic information, which are received from mobile stations to the relay, within one traffic structure.

Preferably, the step of receiving encapsulated uplink traffic from the relay includes collecting handover information of one or more mobile stations and transmitting the handover information from the base station to the relay.

Preferably, the step of receiving encapsulated uplink traffic from the relay includes collecting paging information of one or more mobile stations and transmitting the paging information from the base station to the relay.

Preferably, the step of receiving encapsulated uplink traffic from the relay includes collecting control signals of one or more mobile stations and transmitting the control signals from the base station to the relay.

Preferably, the step of receiving encapsulated uplink traffic from the relay includes receiving at least one control signal of communication quality measurement value, scheduling request, handover request and ranging request measured by one or more mobile stations and collected by the relay.

In another aspect of the present invention, a method for communicating with a relay station according to another embodiment of the present invention comprises allocating a dedicated resource for communication between a relay and a mobile station from the base station; and transmitting information of the dedicated resource to each relay.

Preferably, the step of allocating a dedicated resource includes allocating OFDM symbols different from a resource allocated for system traffic as a dedicated resource for each relay.

Preferably, the step of transmitting information of the dedicated resource to each relay includes transmitting the information of the dedicated resource to a master relay which manages the dedicated resource.

In still another aspect of the present invention, a method for communicating with a relay station according to another embodiment of the present invention comprises receiving resource allocation information of downlink traffic and uplink traffic; and receiving encapsulated downlink traffic from the base station in accordance with the resource allocation information and transferring the encapsulated downlink traffic to corresponding mobile stations, and transferring uplink traffic received from the mobile stations to the base station by encapsulating the uplink traffic in accordance with the resource allocation information.

Preferably, the encapsulated downlink traffic includes traffic information and allocation information of the traffic information, which are to be transferred from the relay to the mobile stations, within one traffic structure.

Preferably, the encapsulated uplink traffic includes traffic information and allocation information of the traffic information, which are received from mobile stations to the relay, within one traffic structure.

In further still another aspect of the present invention, a method for communicating with a relay station according to another embodiment of the present invention comprises receiving information of a dedicated resource allocated for communication between a relay and a mobile station; and transmitting and receiving traffic from the relay to mobile stations or another relay in accordance with the allocated dedicated resource.

Preferably, the step of receiving information of a dedicated resource includes allocating a resource from the relay to a plurality of mobile stations connected with the relay in accordance with the information of the dedicated resource.

Preferably, the step of receiving information of a dedicated resource includes allocating a resource from a master relay to a plurality of mobile stations connected with the master relay in accordance with the information of the dedicated resource.

Although the aforementioned technical description has been divided into uplink and downlink, there may actually be provided the case where the relay receives a signal, the case where the relay transmits a signal, the case where the base station transmits/receives a signal, and the case where the mobile station transmits/receives a signal. In case of the uplink/downlink transmitted by the relay, encapsulation information within the resource used by the relay could be information received by the base station and the mobile station. Accordingly, the encapsulation information includes control information and traffic allocation information, which are to be simultaneously received by the base station and the mobile station. In this case, the control information includes CQI, ACK/NACK, MIMO control information, scheduling request, resource allocation information, handover information, and power saving mode information, which are transmitted and received between the mobile station and the base station.

Also, if the relay is in a receiving mode, there are provided a part where the base station transfers a signal and a part where the mobile station transfers a signal. If the base station and the mobile station do not reach a signal transfer range, the base station and the mobile station can simultaneously perform transmission. In this case, the base station can generate uplink traffic together with another mobile station using corresponding resource while performing relay operation by allocating a resource to the relay. At the same time, the relay properly coordinates the mobile station associated with the relay.

Advantageous Effects

According to the embodiments of the present invention, it is possible to enable communication through a relay using a minimum interface without deterioration of throughput even in the case that a base station does not know detailed attributes of a relay existing in a system. Also, it is possible to coordinate collision through a master relay in case of a system supporting multi-hop relays.

BEST MODE

Hereinafter, the preferred embodiments of the present invention will be described with reference to the accompanying drawings. However, it is to be understood that various modifications can be made in the following embodiments of the present invention, and the scope of the present invention is not limited to the following embodiments.

The embodiments of the present invention provide a method for realizing requirements of a relay system. The system needs a protocol and a procedure considering features of a relay, i.e., bulk transmission/reception. Also, the system may allocate a resource region that can freely be used by a relay.

The embodiments of the present invention will be described in view of protocol and procedure.

A base station defines and processes a relay as one mobile station. However, the relay is characterized in that it can receive and transmit traffic of multiple mobile stations. A support method for the relay is divided into two methods as follows.

One of the methods is that the base station defines traffic of uplink/downlink in the same manner as the existing system and performs communication regardless of a relay. In this case, the base station can control data traffic using a single interface regardless of the fact that a mobile station is directly connected with the base station or performs communication through a relay. However, in order to support a mobile station connected with a relay, the base station needs specialized control command. Namely, the base station allows the relay to transfer basic control information such as handover and paging and broadcast information of the base station to the mobile station. By contrast, the relay serves to transmit handover, channel information, and traffic information, which are transferred from the mobile station, to the base station.

To this end, it is possible to request the relay to perform all operations required for the base station. By contrast, if the base station transmits information to the mobile station regardless of the relay, the relay may collect required information and transfers the information to the mobile station managed by itself. Also, if traffic is transferred to the mobile station without considering a relay, the relay collects uplink/downlink information of the mobile station managed by itself from uplink/downlink traffic and transfers the uplink/downlink information to the mobile station.

Therefore, since every kind of information is transmitted in the same manner as the case having no relay in view of the base station, the relay station becomes a transparent object to the base station. Although this method is suitable for the case when the base station does not know a type of the relay, a problem occurs in that complexity of the relay system can be increased. Also, the base station should readjust round trip delay or relevance time of uplink/downlink resource allocation considering that a specific mobile station is connected with the relay. Accordingly, a problem occurs in that it may affect latency or throughput of another mobile station. A problem also occurs in that the relay system becomes complicated. Moreover, in case of uplink, the relay collects information from the mobile station to transmit the corresponding information through resource position allocated from the base station. In this case, the relay transfers resource allocation information to the mobile station through a downlink, wherein the resource allocation information guides the mobile station to transmit the corresponding information to a resource position managed by the relay, and the mobile station transmits the corresponding information to the resource position allocated from the relay.

On the other hand, if the base station has a special buffer to support the relay, it is possible to solve a problem that throughput is deteriorated due to mobile stations connected with the relay or complexity of the relay is increased. Since downlink traffic or broadcasting data does not have a problem, it is assumed that the relay is transparent with respect to the downlink traffic or broadcasting data.

In the embodiment of the present invention, encapsulation for relay is used. In order that the base station communicates with a specific relay, a control protocol that can know what a mobile station associated with the relay is. Namely, the base station should define a control protocol required while a system is maintained and managed, from the time when the base station enters the system. At this time, a protocol for a batch based process is preferably used. Namely, the base station and the relay simultaneously process one or more mobile station information using one command. For other traffic information, encapsulation is used, and a special buffer of the base station is not needed.

Figure 3:
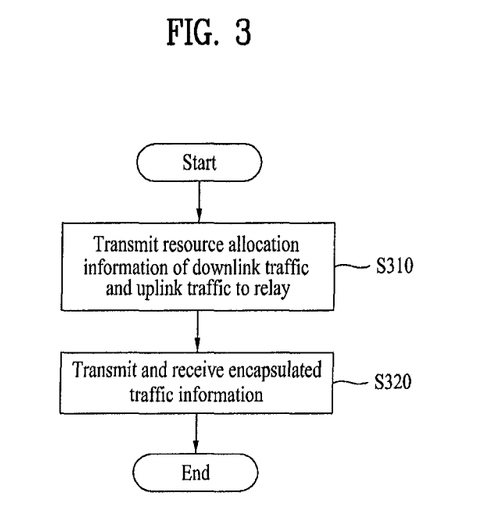
FIG. 3 is a flow chart illustrating a method for communicating with a relay station in accordance with one embodiment of the present invention.

FIG. 3 is a flow chart illustrating a method for communicating with a relay station in accordance with one embodiment of the present invention.

First of all, the base station transmits resource allocation information for downlink traffic and uplink traffic to the relay (S310). The resource allocation information includes information of uplink/downlink resource channels to be used by the relay, signal information, and resource allocation information, wherein the signal information includes control information and data information to be transmitted from the base station to the mobile station, and the control information is to be transferred from the mobile station to the base station. At this time, the control information to be transferred from the mobile station to the base station can be divided into a specified control signal, i.e., a control signal requested from the base station, and a control signal to be randomly transmitted from the mobile station.

Next, the mobile station transmits uplink traffic to the relay connected with itself.

Subsequently, the base station transmits and receives a signal to and from existing mobile stations in accordance with a radio interface rule, and transfers information, which is to be transmitted to mobile stations supported through a relay, to the resource position of the corresponding relay at a time. Also, the relay transfers information to be transferred to the base station, i.e., bundle information to the resource position allocated from the base station, at a time. In this case, the bundle information includes both control signal and data traffic. Resource allocation information and traffic of the relay are encapsulated within the resource allocated to be used by the relay and then transmitted. Namely, control information in the section transmitted by the relay and traffic are encapsulated, and control information transmitted by the mobile station associated with the relay can be transmitted by being incorporated into resource information in the section transmitted by the relay or being included in the section transmitted by the mobile station. The base station transmits downlink traffic to the relay in accordance with the resource allocation information by encapsulating the downlink traffic (S320). At this time, the relay transmits traffic information included in the encapsulated downlink traffic to the corresponding mobile station.

Furthermore, the base station receives encapsulated uplink traffic from the relay in accordance with the resource allocation information (S320). At this time, the relay transmits the uplink traffic collected from the mobile station to the base station.

Also, the relay can communicate with the base station through a minimum interface.

Figure 4:
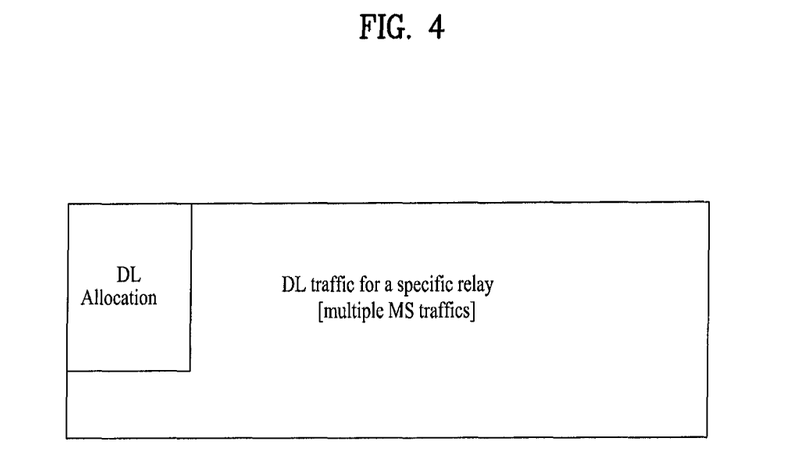
FIG. 4 is a diagram illustrating a structure of downlink traffic transmitted from a base station to a relay in accordance with FIG. 3.
Figure 5:
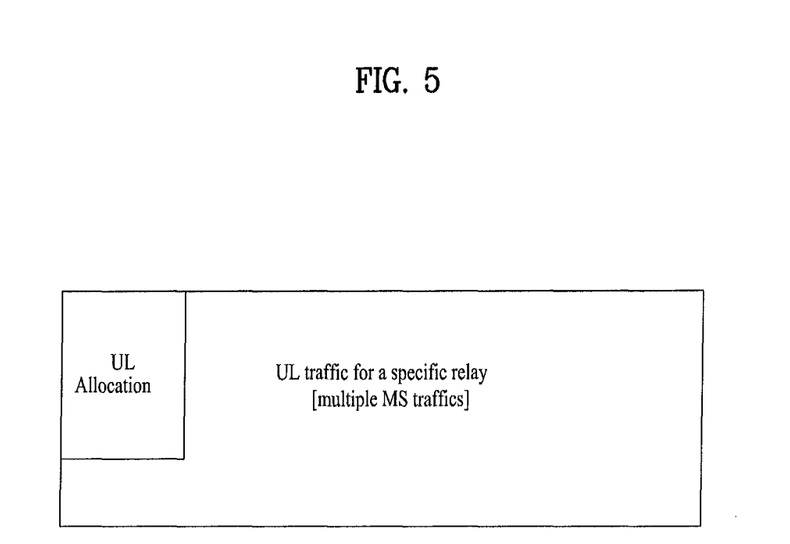
FIG. 5 is a diagram illustrating a structure of uplink traffic transmitted from a relay to a base station in accordance with FIG. 3.

FIG. 4 and FIG. 5 are diagrams illustrating structures of uplink/downlink traffic transmission for communication between a base station and a relay, in which information to be transmitted to mobile stations managed by the relay or information to be received from the mobile stations and transmitted to the base station is included in one traffic structure. The relay which manages a plurality of mobile stations receives information transmitted to the corresponding mobile stations from the base station through encapsulation or encapsulates mobile station traffic information to be transmitted to the base station by mapping the traffic information in a single type.

FIG. 4 illustrates a data structure on a downlink resource allocated for relay.

If the system transmits downlink traffic to a specific relay, it allocates a downlink resource to the corresponding relay. Information included in the allocated downlink resource is obtained by reusing a framework used by the base station as a downlink. Particularly, if there are one or more mobile station traffics to be transferred to the relay, control information, resource allocation information within the downlink traffic resource allocated to the relay, i.e., allocation information of traffic information and traffic of the corresponding mobile station are simultaneously transmitted to the relay. In this case, joint coding can be used as channel coding, in which control information, allocation information, and traffic are simultaneously coded, or channel coding performed by dividing control information, allocation information and traffic into one or more can be used.

FIG. 5 illustrates a structure of uplink traffic transmitted from a relay to a base station.

The relay receives allocation information of resource to be used from the base station, and structuralizes allocation information, i.e., control information, allocation information of traffic information, and uplink traffic within the resource allocated for uplink to transmit the information.

Information included in the structure of FIG. 5 is divided into one or more for coding and packetizing.

Values defined in the system are used as allocation information and parameters used in the structures of FIG. 4 and FIG. 5. If the relay supports heterogeneous radio access technologies, allocation information, channel coding, and mapping, which are suitable for the corresponding system, are defined.

Also, procedure and protocols for informing the base station of control information transferred to mobile stations connected with the relay and feedback information of the corresponding mobile stations are needed. Examples of the procedure and protocols are as follows.

First, there is provided a hand-over procedure. Since the mobile station connected with the relay is beyond a region directly affected by the base station, such as the contour of cell, event such as handover within the relay occurs frequently. In this case, in order to control such event, separate command of handover procedure to each mobile station is not efficient. Accordingly, in order to simultaneously perform handover procedures of mobile stations, when handover information is transferred to the relay, one or more kinds of connection information of the mobile stations are simultaneously transferred to the relay.

Second, there is provided a paging procedure. Paging information can be transferred to the mobile station using the existing protocol and procedure used in the system or a specific relay. If paging information is separately transferred to the specific relay, it is preferable that one or more kinds of mobile station information are transferred to the relay at a time. If the system follows the original system procedure without directly transferring the information to the relay, the relay may simply repeat the procedure of transferring the paging information to the mobile station by reading the paging information, or may transfer only a specific content of the paging information to the mobile station by decoding the specific content.

Third, there is provided measurement reporting. In order that the system is operated properly, report of communication quality obtained by the mobile station from the relay should be transferred to the base station. At this time, since measurement report should be assumed in view of the relay not the base station, measurement values transferred to the base station include communication quality measured in the position of the mobile station connected with the relay and a measurement value of a signal transmitted from the mobile station in the relay position. The measurement values should be reported to the base station. To this end, the system needs a measurement report system different from the existing report system. For measurement report, it is efficient that the relay transfers one or more kinds of mobile station information to the base station at a time. Also, different kinds of channel coding can be applied to the types of the measurement values. Furthermore, for the measurement value, the base station can transfer information as to whether the corresponding mobile stations and/or relays should perform measurement using what information in what section. At this time, the information transferred from the base station can designate a frame structure in the corresponding section, for example, a CP and pilot.

Fourth, there is provided a data related control channel. The existing system separately defines a control channel for each of uplink and downlink with respect to traffic of the mobile stations, and can improve reaction speed of the system through such a separate definition. However, if the relay is used, the mobile station cannot read a control channel directly and transmit the corresponding signal due to the relay. Accordingly, transmission through the relay can only be performed.

In this respect, the relay collects control signals to be transmitted from one or more mobile stations, for example, CQI, MIMO information, CSI, and ACK/NACK, scheduling request, and transfers them to the base station at a time.

As described above, if one or more kinds of mobile station information are included in the control channel and channel coding is applied to the control channel, it means that the system can transfer control information in a more reliable mode.

Figure 6:
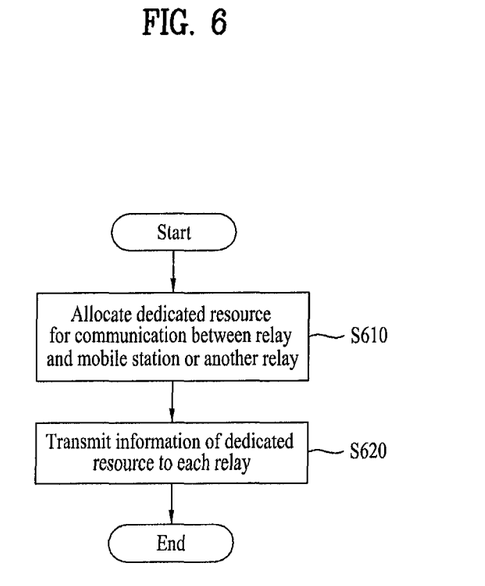
FIG. 6 is a flow chart illustrating a method for communicating with a relay station in accordance with another embodiment of the present invention.

FIG. 6 is a flow chart illustrating a method for communicating with a relay station in accordance with another embodiment of the present invention.

First of all, the base station allocates a resource dedicated for communication between the relay and the mobile station (S610). At this time, the allocated resource can freely be used by the relay. Although this status may mean the status having no communication with the base station, it may be considered that the relay and the base station simultaneously transmit specific information or the relay and the mobile station simultaneously transmit specific information, so as to obtain diversity gain.

Next, the base station transmits information of the allocated resource to each relay (S620). At this time, if the transmission of the information is extended to a plurality of relays, a corresponding region is coordinated through a master relay, and the plurality of relays freely use uplink/downlink resources within the coordinated region, whereby the relays can communicate with the mobile station.

Meanwhile, for communication between the relay and the base station, the base station transfers information of downlink to be read by the relay and information of a region that can transmit uplink traffic to the relay. However, in order that the relay actually communicates with the mobile station or another relay, a resource of another region is needed. If the relay transmits a signal to another relay or the mobile station, the signal transmitted from the relay may cause interference with a signal transmitted from the base station or a signal transmitted from the mobile station. On the other hand, since it is not possible to identify how many relays are associated with communication, the relay cannot use the downlink/uplink resources freely. Accordingly, the base station should allocate downlink/uplink resources that can freely be used by the relay. To this end, the base station provides a resource that can freely be used by the relay, i.e., a means that can negotiate with the relay with respect to a dedicated resource.

Figure 7:
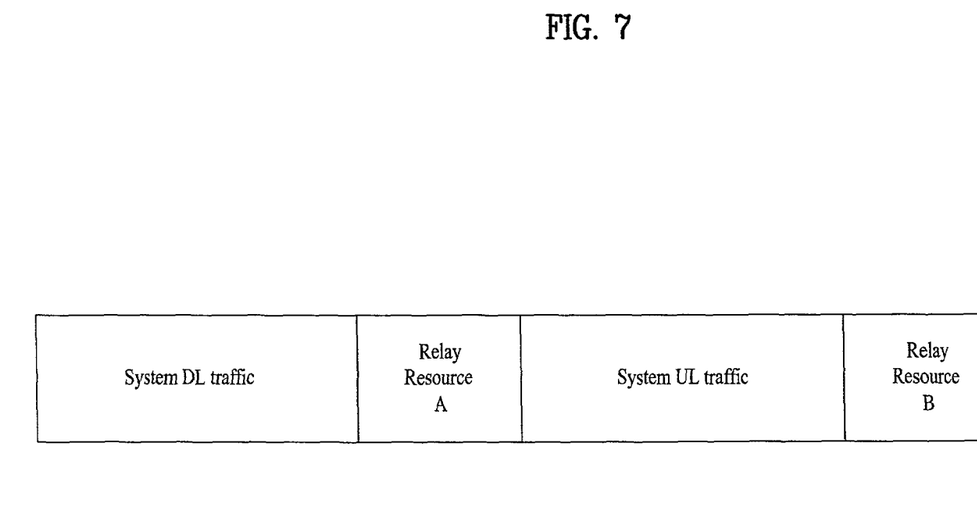
FIG. 7 is a diagram illustrating an example of a dedicated resource allocated from a base station to a relay in accordance with FIG. 6.

FIG. 7 is a diagram illustrating an example of dedicated resource allocated from a base station to a relay in accordance with FIG. 6.

As illustrated in FIG. 7, the system can generate resource regions in a downlink or an uplink, wherein the resource regions can freely be used by the relay. The operation between the relay and the mobile station and the operation between the relay and another relay can be designed separately from the operation of the base station. In this dedicated resource regions, the relay can use the resource without restriction. The dedicated resources (relay resource A and relay resource B) can have a type allocated to be completely divided from another system traffic using different system traffics (system DL traffic and system UL traffic) and different OFDM symbols or a type shared with the existing system traffic using different subcarriers in the same OFDM symbol as that of the existing system traffic. However, in order to ensure the degree of freedom of the relay, it is preferable that the base station allocates different system traffics and different OFDM symbols. The relay can use a dedicated resource of a downlink region for only downlink traffic or use a dedicated resource of an uplink region for only uplink traffic, or may use these resources together.

Figure 8:
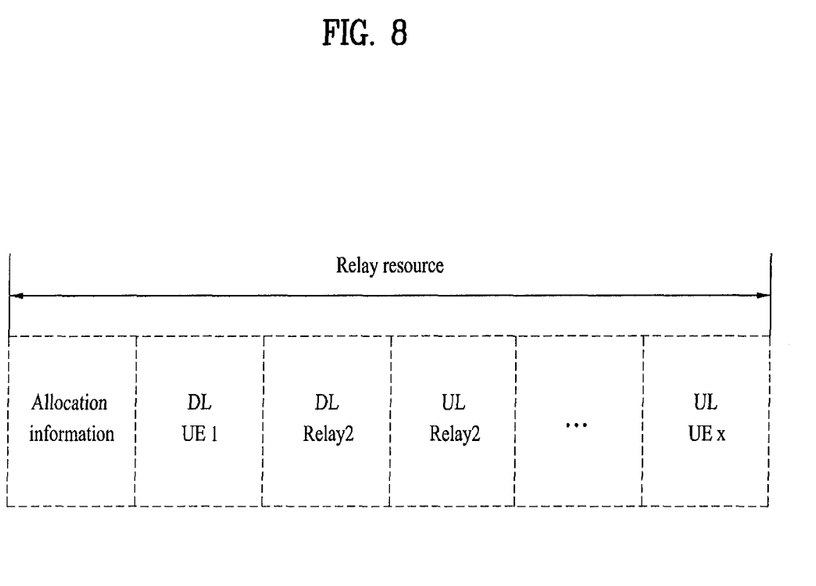
FIG. 8 is a diagram illustrating an example of allocating resources from a master relay to a mobile station to relays in accordance with FIG. 7.

FIG. 8 is a diagram illustrating an example of allocating resources from a master relay to a mobile station to relays in accordance with FIG. 7.

Within one resource region, the relay can transmit downlink traffic to several mobile stations or receive uplink traffic from the mobile station. If there exists a master relay which manages resources of different relays and/or different mobile stations, the master relay transfers resource region allocation information of different relays and/or different mobile stations to the different relays and/or the different mobile stations, whereby traffic between the mobile station and the relay can be controlled. In this case, various allocation types may be provided actually. Namely, each resource can be divided into TDM, FDM, and CDM. The master relay controlling the resources divided as illustrated in FIG. 8 performs coordination so as not to cause collision between the mobile stations, between the relays, and between the mobile station and the relay. The relay or the mobile station controlled by the master relay transmits and receives a signal in accordance with allocation information of the master relay and a specific protocol defined by the master relay.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention provides a method for supporting an unknown relay in a system such as IEEE 802.16m, and is not limited to a specific radio interface. The protocol, the procedure, and the resource allocation method described in the embodiments of the present invention can be applied to a system associated apparatus which supports a relay, such as a base station, a relay, and a mobile station.

The invention claimed is:

1. A method for communicating with a master relay station, in which a base station allocates a resource to perform communication, the method comprising:
    transmitting, from the base station to the master relay station, resource allocation information of downlink traffic and uplink traffic for use of communication between the base station and the master relay station;
    transmitting, from the base station to the master relay station, dedicated resource allocation information for use of communication among a plurality of relay stations and a plurality of mobile stations; and
    transmitting the downlink traffic from the base station to the master relay station by encapsulating the downlink traffic in accordance with the resource allocation information, and receiving encapsulated uplink traffic from the master relay station in accordance with the resource allocation information,
    wherein a dedicated resource indicated by the dedicated resource allocation information is reallocated by the master relay station for the plurality of relay stations and the plurality of mobile stations.

2. The method of claim 1, wherein the encapsulated downlink traffic includes control information, traffic information, and allocation information of the traffic information, which are to be transferred from the master relay station to the plurality of mobile stations, within one traffic structure.

3. The method of claim 1, wherein the encapsulated uplink traffic includes control information, traffic information, and allocation information of the traffic information, which are received from the plurality of mobile stations at the master relay station, within one traffic structure.

4. The method of claim 1, wherein the step of transmitting the downlink traffic to the master relay station includes:
    transmitting handover information of one or more mobile stations from the base station to the master relay station.

5. The method of claim 1, wherein the step of transmitting the downlink traffic to the master relay station includes:
    transmitting paging information of one or more mobile stations from the base station to the master relay station.

6. The method of claim 1, wherein the step of transmitting the downlink traffic to the master relay station includes:
    transmitting control signals of one or more mobile stations from the base station to the master relay station.

7. The method of claim 1, wherein the step of receiving encapsulated uplink traffic from the master relay, station includes:
    receiving at least one control signal of communication quality measurement value, scheduling request, handover request and ranging request measured by one or more mobile stations and collected by the master relay, station.

8. A method for communicating with a master relay station, in which the master relay station communicates with a base station, the method comprising:
    receiving, at the master relay station from the base station, resource allocation information of downlink traffic and uplink traffic for use of communication between the base station and the master relay station;
    receiving, at the master relay station from the base station, dedicated resource allocation information for use of communication among a plurality of relay stations and a plurality of mobile stations;
    reallocating, at the master relay station, a dedicated resource indicated by the dedicated resource allocation information for the plurality of relay stations and the plurality of mobile stations; and
    receiving, at the master relay station, encapsulated downlink traffic from the base station in accordance with the resource allocation information and transferring the encapsulated downlink traffic to corresponding mobile stations, and transferring uplink traffic received from the mobile stations to the base station by encapsulating the uplink traffic in accordance with the resource allocation information.

9. The method of claim 8, wherein the encapsulated downlink traffic includes traffic information and allocation information of the traffic information, which are to be transferred from the master relay station to the plurality of mobile stations, within one traffic structure.

10. The method of claim 8, wherein the encapsulated uplink traffic includes traffic information and allocation information of the traffic information, which are received from the plurality of mobile stations at the master relay station, within one traffic structure.

* * * * *